United States Patent Office 3,118,727
Patented Jan. 21, 1964

3,118,727
METHOD OF REMOVING NITROGEN OXIDES FROM GASES
Johann G. E. Cohn, West Orange, N.J., assignor, by mesne assignments, to Engelhart Industries, Inc., Newark, N.J., a corporation of Delaware
No Drawing. Filed Oct. 12, 1956, Ser. No. 615,496
11 Claims. (Cl. 23—2)

This invention relates to the recovery of heating values from and the purification of the waste gases produced by the oxidation of ammonia for the production of nitric acid. The purification step entails the elimination of oxides of nitrogen from the waste gases.

In the production of nitric acid by the oxidation of ammonia, it is difficult to convert all of the oxides of nitrogen to nitric acid and, as a result of the incomplete conversion of these oxides, they are discharged with the waste or tail gases. The presence of such oxides in the waste gases is undesirable, as they are of a corrosive nature and constitute a pollution problem.

The waste or tail gases of nitric acid processes generally have a composition, on a dry basis, of about 0.1–0.5 percent by volume of mixed nitrous and nitric oxides, about 3–4 percent by volume of oxygen, and the remainder is nitrogen. In addition, various amounts of steam may be included with the waste gas.

Generally speaking, in the method of this invention, these waste or tail gases are catalytically purified to eliminate the oxides of nitrogen, while simultaneously recovering the heating values therefrom, by mixing with the waste gases, a fuel, preferably a hydrocarbon fuel such as natural gas, methane, or the like, and passing the mixture of waste gases and fuel over a rhodium or palladium-containing catalyst at reaction temperature. The rhodium or palladium-containing catalyst may be rhodium and/or palladium per se on a suitable support, or rhodium or palladium in admixture with another of the platinum group metals, i.e., platinum, ruthenium, iridium and osmium. Suitable catalyst supports are alumina, silica, kieselguhr, silica gel, diatomaceous earth and other similar catalyst metal supports.

For optimum conversion, the catalyst metal should be within the range of about 0.1–5 percent by weight of the catalyst metal and support, preferably about 0.1–1 percent by weight of the catalyst metal and support.

The support for the catalyst metal may be in the form of pellets, granules, or powder, and preferably comprises alumina. The supported catalyst may be prepared in any suitable manner, i.e., by treating the carrier or support with a solution of a suitable metal compound, and then reducing the metal compound to metal.

In the process, the waste or tail gases are heated to a suitable temperature, which must be below that imposed by equipment limitations and above that required to initiate and sustain the catalytic combustion, as a result of which the oxides of nitrogen are reduced to nitrogen and water. After the waste gases are heated to the proper temperature, a fuel, such as natural gas, is added to the waste gas stream, and the mixture of fuel and waste gas is then passed through a bed of rhodium or palladium-containing catalyst. The heat generated in this step may be utilized to raise the gas temperature, or in a vessel of suitable design, may be used to generate steam in an isothermal fashion. The hot purified gas may then be passed into a turbine, or it may be vented to the atmosphere.

More specifically, a temperature of about 725° F. is required to initiate the catalytic combustion reaction, and this temperature can be subsequently lowered to about 700° F. The required inlet gas temperature will vary somewhat depending upon the space velocity and the amount and kind of fuel employed.

The space velocity may be in the range of about 10,000 to 130,000 standard volumes of gas per volume of catalyst per hour, preferably 60,000 to 110,000 on a volume basis, these space velocities being measured at 70° F. and at atmospheric pressure.

The specific inlet temperature cannot be stated with precision due to the fact that the temperature depends upon the specific equipment arrangement employed. For example, initial reaction temperatures observed at gas flow rates of 200 to 400 standard cubic feet per hour were appreciably lower than those observed at lower rates of about 2 cubic feet per hour. It is probable that as equipment size increases, the initial reaction temperature decreases due to the fact that heat losses from small equipment are relatively much greater than from large scale equipment.

The natural gas or methane fuel preferably used in this invention may have a varied composition, and in general, the more methane used, the more complete will be the removal of oxides of nitrogen. However, if a large excess of methane above the stoichiometric amount is used, i.e., one-half the oxygen according to the equation:

$$CH_4 + 2O_2 \rightarrow CO_2 + 2H_2O$$

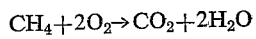

there is a decrease in the temperature differential across the catalyst. It is preferred to operate with a fuel-to-oxygen ratio slightly greater than that resulting from using stoichiometric quantities, i.e.—

$$\frac{CH_4}{O_2} = 0.55 - 0.7$$

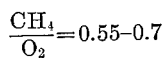

The invention will be further illustrated by reference to the following specific examples:

EXAMPLE I

A series of runs was made using various catalysts to determine the minimum reaction or kindling temperature, i.e., the initial or minimum temperature at which the catalytic combustion reaction is sufficiently promoted by the catalyst so that the reaction is sustained and complete combustion results. In these runs, the fuel was methane added to an air stream, or to a mixture of nitrogen and oxygen in proportions other than those present in air. The gas mixture, including the fuel, was preheated and passed over the catalyst indicated in the table below, and for each catalyst the kindling temperature, or minimum reaction temperature, is that given in the table, and is the temperature at which combustion was promoted. The temperatures in column A below, are the minimum reaction temperatures of a stoichiometric mixture of methane and 3 percent by volume of oxygen, added as air in nitrogen. In column B, the temperatures are the minimum reaction temperatures obtained using a concentration of 1.5 percent by volume of methane in air. In these experiments, the final reaction temperature was not measured, as these runs were made only to determine the efficiency of the various catalysts listed in lowering the kindling or initial reaction temperature of the mixtures of fuel with nitrogen and oxygen.

The temperatures obtained were as follows:

| Catalyst | CH₄ | |
| --- | --- | --- |
| | A (3% O₂), °F. | B (21% O₂), °F. |
| 0.5% Pt on Al₂O₃ | 986 | 1,167 |
| 0.5% Pd on Al₂O₃ | 779 | 707 |
| 0.5% Ru on Al₂O₃ | 950 | 1,003 |
| 0.5% Rh on Al₂O₃ | 689 | 734 |
| 0.5% Ir on Al₂O₃ | 900 | 1,112 |
| 0.5% Ag on Al₂O₃ | 1,141 | |
| 0.25% Pd & 0.25% Rh on Al₂O₃ | 752 | |
| 0.3% Pt & 0.2% Rh on Al₂O₃ | 707 | |
| 0.4% Pt on 0.1% Rh on Al₂O₃ | 770 | |
| 0.5% Ni on Al₂O₃ | *No apparent reaction at 1,112° F. | |

From the foregoing results, it is apparent that rhodium has the highest efficiency in lowering the kindling or initial reaction temperature of a gas mixture containing 3 percent oxygen, while palladium is the most efficient for 21 percent oxygen.

EXAMPLE II

A series of runs was made to determine at what temperature methane would be oxidized in a gas containing, by volume, 96.5 percent nitrogen, 3 percent oxygen, and approximately 0.5 percent oxides of nitrogen. The reactor used included a 2 inch outside diameter stainless steel tube, approximately 24 inches long and insulated on the outside. A screen was placed near the center of the pipe and 100 grams of catalyst consisting of 0.5 percent rhodium on alumina were put inside the reactor. The reactor was equipped with 3 thermocouples, one bare couple above the catalyst bed, one shielded couple in a thermowell in the catalyst bed, and one bare couple below the catalyst bed. Gas containing 98 percent nitrogen and 2 percent hydrogen was mixed with air and passed through a purifier to produce a mixture of nitrogen and oxygen containing approximately 3 percent of the latter. This gas was passed through a reactor at a volume hourly space velocity of 126,000 and the reaction was initiated by added methane to the mixture, the mixture being preheated to an inlet temperature of 750° F. The reaction temperature increased to 1250° F. before any nitric oxide was added, and it was then added in volume percentages in the range of 0.1 percent to 0.443 percent. The methane added was 2.47 percent by volume and the temperature differential across the catalyst increased from 509° F. at the beginning of the run to 704° F. at the finish, the run being continued for a period of approximately 4 hours.

EXAMPLE III

The general procedure of Example II above was repeated, maintaining a gas inlet temperature of 750° F. and a nitric oxide concentration of 0.443 percent by volume. The outlet temperature at the start of the addition of the nitric oxide was 1290° F., using 2.54 volume percent methane in the gas mixture, and the outlet temperature rose 39° F. within four minutes. The amount of methane added was gradually reduced until the methane was added at the rate of 2.1 volume percent at which point the temperature had increased to 1400° F. Further reduction of the methane added decreased the outlet temperature until at 1.9 volume percent methane, the outlet temperature was 1250° F.

EXAMPLE IV

The general procedure of Example II was repeated with the exception that the gas inlet temperature was maintained at 700° F. In the absence of nitric oxide in the gas mixture, the addition of 1.8 volume percent methane maintained an outlet temperature of 1250° F. Orsat analyses of the gases showed 3.4 volume percent oxygen at the inlet, with 1.6 volume percent CO₂ and 0.6 percent oxygen at the outlet. Using the above conditions, the reaction temperature decreased when 0.17 volume percent nitric oxide was added to the mixture. The nitric oxide was then shut off and the methane added was increased to 2.2 volume percent, resulting in an increase in the outlet temperature to 1331° F. At that point the nitric oxide was added again, and the temperature rose 24° F. within 1.5 minutes. The nitric oxide was increased to 0.37 volume percent and the temperature rose an additional 15° F. The gas flows were maintained with these conditions and the temperature gradually dropped to 1131° F., at which point the methane feed was increased to 2.45 volume percent, and the temperature then rose to 1250° F.

EXAMPLE V

This run was a continuation of that described in Example IV above, i.e., maintaining a 700° F. inlet temperature, and methane addition in the range of 2.45 to 2.52 volume percent. The nitric oxide addition was varied from 0.17 to 0.37 volume percent, and the outlet temperature varied throughout the run, which was of eight hours duration, from 1200° to 1300° F. Two Orsat analyses showed 3.2 and 3.8 volume percent oxygen at the inlet to the reactor, while two separate analyses showed 1.6 percent CO₂ (3.2 percent O₂) with 0.6 percent O₂ and 1.7 percent CO₂ (3.4 percent O₂) with 0.5 percent O₂.

EXAMPLE VI

In this run, the space velocity was reduced to 109,000 in order to maintain more even flow rates. The run was similar to that of Example V in that an inlet temperature of 700° F. was employed. The amount of methane added was reduced, however, to 2.3 to 2.5 volume percent, and the nitric oxide added was varied from 0.20 to 0.51 volume percent. Outlet temperatures in the range of 1210 to 1325° F. were recorded, and Orsat analyses of the outlet gas showed 1.7 percent CO₂ with 0.5 percent O₂. Slight increases in temperature were noted as the concentration of nitric oxide was increased.

EXAMPLE VII

This run was the same as that of Example VI above, except that instead of bringing the mixture of nitric oxide and methane up to final reaction temperature, i.e., an outlet temperature such as 1250° F., and then adding the nitric oxide as in previous runs, the nitric oxide was added to the preheated mixture, and the entire mixture was passed through the reaction chamber. With an inlet temperature of 700° F., there was incomplete reaction only with a temperature increase of 90° F. The temperature of the incoming gas mixture was then increased to 725° F. at which point the reaction initiated vigorously, and the inlet temperature was maintained at approximately 720° F. for the balance of the run, which was of eight hours' duration. The methane was added at the rate of 2.37 percent by volume at the start of the run, and was gradually reduced to 2.12 volume percent at the end.

Orsat analysis of the inlet gas showed 2.9 volume percent oxygen, and two outlet analyses showed 1.4 volume percent CO₂ with 0.1 percent oxygen, and 1.3 volume percent CO₂ with 0.2 percent oxygen. Outlet temperatures were reasonably stable, and varied from 1250° to 1300° F.

EXAMPLE VIII

This run was a repeat of that described in Example VII above, with the nitric oxide being added to the gas mixture before the reaction mixture was brought up to reaction temperature. With a preheat temperature of 725° F., and a methane concentration of 2.17 volume percent, the reaction could not be initiated, and it was necessary to increase the methane concentration to 2.52 volume percent to attain the reaction temperature, and then the feed of methane was reduced to 2.27 volume percent, while obtaining an outlet temperature of 1314° F.

EXAMPLE IX

This run was a repeat of that described in Example VIII above, starting with a concentration of 2.52 volume percent methane. The reaction initiated at 725° F. and reached a temperature of 1235° F. within four minutes. The temperature then dropped slightly, and the feed of methane was increased. With a concentration of 3.1 volume percent methane, and an inlet temperature of 700° F., the outlet temperature was very stable and varied between 1241° and 1259° F. Orsat analyses at the gas inlet showed 3.1 volume percent oxygen, and at the outlet showed 1.8 volume percent CO with 0.4 volume percent oxygen.

EXAMPLE X

A mixture of nitrogen and oxygen containing 2.85 volume percent oxygen was passed through the reactor described in Example II above at a volume space velocity of 109,000 while various amounts of methane were added. The temperatures were recorded, and the outlet gas was analyzed. No nitric oxide was used in this run, in order to determine the effect of variation in the methane concentration. The inlet temperature varied gradually from 712° to 730° F. and, in the results given below, the temperature differentials across the catalyst are listed, rather than the outlet temperature.

The results are as follows:

| Percent methane: | Temperature differential, ° F. |
|---|---|
| 1.66 | 490 |
| 1.59 | 512 |
| 1.52 | 533 |
| 1.45 | [1] 422 |
| 1.49 | [2] 474 |
| 1.52 | 536 |
| 1.59 | 550 |
| 1.66 | 564 |
| 1.72 | 557 |
| 1.93 | 517 |

[1] 5 Min.—Temperature Dropping.
[2] 10 Min.—Temperature Dropping.

*Analysis Inlet Gas*

[Percent O₂]

2.85
2.54
2.98
2.85
3.00

*Analysis Outlet Gas*

| Measured CH₄ in Inlet, percent | CO₂, percent | O₂, percent | CO, percent | H₂, percent | CH₄, percent |
|---|---|---|---|---|---|
| 1.66 | 1.45 | 0.23 | -------- | 1.01 | 0.16 |
| 1.52 | 1.48 | 0.20 | -------- | 0.56 | 0.00 |
| 1.93 | 1.19 | 0.10 | 0.38 | 0.35 | 0.56 |

EXAMPLE XI

This run was as that described as Example X above, except that 0.39 volume percent nitric oxide was added to the nitrogen —2.85 percent oxygen mixture, before the addition of the methane to initiate the reaction, and was added at a constant rate during the run.

The results are as follows:

| Time, min. | Percent CH₄ | Average Temperature Differential, ° F. |
|---|---|---|
| Start | 1.66 | --- |
| 12 | 1.66 | 210 |
| 24 | 1.79 | 460 |
| 35 | 1.90 | 600 |
| 6 | 1.86 | 582 |
| 7 | 1.83 | 578 |
| 12 | 1.79 | 500 |
| 50 | 1.83 | 550 |
| 56 | 1.83 | 500 |
| 11 | 1.86 | 510 |
| 21 | 1.83 | 514 |
| 13 | 1.86 | 550 |
| 41 | 1.83 | 520 |
| 64 | 1.83 | 500 |
| 12 | 1.86 | 527 |
| 10 | 1.85 | 512 |
| 4 | 1.86 | 525 |
| 25 | 1.83 | 543 |
| 9 | 1.86 | 550 |

The oxygen content in the gas mixture calculated to 2.85 percent and checked by Orsat analysis to 2.85 percent, 2.61 percent and 3.00 percent.

*Outlet Gas Analysis*

| Measured CH₄ in Inlet, percent | CO₂, percent | O₂, percent | CO, percent | H₂, percent | CH₄, percent | ΔT, ° F. |
|---|---|---|---|---|---|---|
| 1.83 | 1.22 | 0.56 | 0.00 | 0.83 | 0.00 | 558 |
| 1.83 | 1.19 | 0.83 | 0.00 | 0.23 | 0.44 | 518 |
| 1.83 | 1.30 | 0.78 | 0.00 | -------- | 0.00 | 515 |

Although not noted in the above tests, the outlet gas was checked for residual oxides of nitrogen by bubbling the gas through a solution of sulphanilic acid and alpha napthalamine in acetic acid. While this test is not quantitative, it was indicative of a residual oxides of nitrogen concentration below 10 p.p.m.

EXAMPLE XII

In this run, carbon monoxide was added to the primary gas stream in addition to the nitric oxide before preheating the mixture. Using volume space velocities of about 121,000 and 0.5 volume percent nitric oxide, the oxygen content was held between 2.62 and 2.67 volume percent. Using inlet temperatures in the range of 720 to about 740° F., 1.78 volume percent methane was added initially with no carbon monoxide. The temperature differential gradually increased to 513° F. and finally to 544° F. When 0.37 volume percent carbon monoxide was added, the temperature differential increased further to from 550 to 570° F. At this point the methane was shut off, while the flow of nitric oxide and carbon monoxide was left on and the reaction temperature was quickly lost. With an inlet temperature of 696° F. and a temperature differential across the catalyst of 40° F., the reaction initiated immediately upon the addition of 1.75 volume percent methane. The temperature rose until it reached a maximum differential of 619° F., with carbon monoxide and nitric oxide present. When the carbon monoxide was shut off, the temperature differential diminished to around 375° F. at first, and then came up finally to a maximum of 560° F. Shutting off the nitric oxide at this point caused the temperature differential to drop to 525° F. The oxides of nitrogen was completely reduced.

EXAMPLE XIII

In this example the general procedure and apparatus of Example II above were employed, with the exception that the catalyst consisted of 0.5 percent palladium on alumina. The fuel used was commercially pure methane, and the fuel was passed over the catalyst at a space velocity of 64,000 volumes per volume of catalyst per hour. The simulated waste or tail gas used contained, by volume, 1.9 percent methane, 2.7 to 3.1 percent oxygen, 0.64 percent nitric oxide, 2.1 to 2.7 percent water, and the balance was nitrogen. With inlet temperatures in the range of 740 to 760° F., outlet temperatures of 1200 to 1320° F. were observed, and, simultaneously, the nitric oxide was substantially completely removed.

EXAMPLE XIV

Following the general procedure of Example XIII above and using a 0.5 percent palladium on alumina catalyst, a run was made using a simulated coke oven gas having the following composition:

| | Percent |
|---|---|
| CO | 39.6 |
| $H_2$ | 14.93 |
| $CH_4$ | 5.95 |
| $N_2$ | 39.57 |

The waste or tail gas consisted, by volume, of 0.15 percent nitric oxide, 18 percent water, oxygen as stated in the table below, and the balance was nitrogen. Space velocities used were in the range of 59,700 to 62,500 volumes per volume per hour. With inlet gas temperatures in the range of 955 to 980° F., the outlet gas temperatures and nitric oxide content varied in the manner indicated below with variations in the fuel-to-gas ratio (the gas is expressed as percent oxygen):

| Percent $O_2$ | Percent Fuel | Oxygen to fuel ratio | Outlet Temp., °F. | Percent $NO_2$ out |
|---|---|---|---|---|
| 2.10 | 7.2 | 0.29 | 1,355 | 0.0015 |
| 2.53 | 7.42 | 0.34 | 1,440 | 0.005 |
| 2.1 | 5.7 | 0.37 | 1,260 | 0.0015 |
| 2.16 | 5.11 | 0.42 | 1,360 | 0.016 |
| 2.47 | 5.31 | 0.47 | 1,390 | 0.061 |

As a result of the runs made in accordance with this invention, it was found that the presence of 0.60 to 0.78 volume percent of nitric oxide in the inlet gas, while using outlet temperatures in the range of 1230° to 1250° F. contributes toward higher outlet temperatures or produces more heat, due to the exothermic splitting of nitric oxide. With the same concentration of nitric oxide, an outlet temperature of 1150° F., or lower, hinders the reaction. Operating the catalyst chamber at a pressure of 6 p.s.i.g. has little or no effect upon the reaction, compared with operation at a pressure of 4 p.s.i.g., whereas space velocities greater than about 60,000 to 61,000 require a higher percentage of methane to attain the reaction temperatures. In general, the absence of nitric oxide, the greater the amount of methane used, the higher the outlet temperature will be up to a certain point, and the converse is also true. However, when nitric oxide is present, it is desirable to use an optimum percentage of methane, since below the optimum, the reaction heat and temperature necessary to split the nitric oxide is not developed, and the combustion of methane is adversely affected. Above the optimum quantity, excess methane produces little increase in temperature and eventually produces less temperature increase.

In addition to the other advantages of the process of this invention, the gases discharged from the purification process of the invention consists substantially only of nitrogen, easily removable carbon dioxide, and water, and it should therefore be possible to utilize the nitrogen in ammonia synthesis, for example.

It will be obvious to those skilled in the art that many modifications may be made within the scope of the present invention without departing from the spirit thereof, and the invention includes all such modifications.

What I claim is:

1. A process for the elimination of oxides of nitrogen from waste gases from nitric acid processes which comprises contacting an admixture of the waste gases and a gaseous hydrocarbon fuel with a catalyst selected from the group consisting of rhodium and palladium-containing catalysts at an initial reaction temperature below about 1400° F.

2. A process for the elimination of oxides of nitrogen from waste gases from nitric acid processes which comprises contacting an admixture of waste gases and a gaseous hydrocarbon fuel with a catalyst selected from the group consisting of rhodium and palladium-containing catalysts at an initial reaction temperature in the range of about 690° F. to 780° F.

3. A process for the elimination of oxides of nitrogen from waste gases from nitric acid processes which comprises contacting an admixture of the waste gases and a gaseous hydrocarbon fuel with a rhodium-containing catalyst at an initial reaction temperature in the range of about 690° F. to 780° F.

4. A process for the elimination of oxides of nitrogen from waste gases from nitric acid processes which comprises contacting an admixture of the waste gases and a gaseous hydrocarbon fuel with a catalyst selected from the group consisting of rhodium and rhodium in admixture with another platinum-group metal at an initial reaction temperature below about 1400° F.

5. A process for the elimination of oxides of nitrogen from waste gases from nitric acid processes which comprises contacting an admixture of the waste gases and a gaseous hydrocarbon fuel with a catalyst selected from the group consisting of palladium and palladium in admixture with another platinum-group metal at an initial reaction temperature below about 1400° F.

6. A process according to claim 5 in which the catalyst is palladium.

7. A process according to claim 4 in which the catalyst is rhodium.

8. A process according to claim 4 in which the catalyst is rhodium in admixture with palladium.

9. A process according to claim 4 in which the fuel is natural gas.

10. A process according to claim 4 in which the initial reaction temperature is in the range of about 690° F. to 780° F.

11. A process for the elimination of oxides of nitrogen from waste gases from nitric acid processes which comprises contacting an admixture of the waste gases and natural gas with a catalyst selected from the group consisting of rhodium and palladium-containing catalysts at an initial reaction temperature below about 1400° F.

References Cited in the file of this patent

UNITED STATES PATENTS

| 1,497,751 | Hopkinson | June 17, 1924 |
| 1,935,505 | Jean et al. | Nov. 14, 1933 |
| 1,962,485 | Dely | June 12, 1934 |
| 2,076,953 | Lacy | Apr. 13, 1937 |
| 2,475,155 | Rosenblatt | July 5, 1949 |
| 2,910,343 | Childers et al. | Oct. 27, 1959 |

FOREIGN PATENTS

| 340,016 | Great Britain | Dec. 16, 1930 |
| 676,287 | Great Britain | July 23, 1952 |

OTHER REFERENCES

Duparc et al.: "Recherches sur la catalyse gazeuse au moyen des métaux du groupe du platine," Helvetica Chimica Acta, volume 8, 1925, pages 609–631, Geneva.